(12) United States Patent
Phanopoulos et al.

(10) Patent No.: US 9,815,911 B2
(45) Date of Patent: Nov. 14, 2017

(54) PROCESS FOR PREPARING DERIVATIZED POLYSACCHARIDES

(71) Applicant: Huntsman International LLC, The Woodlands, TX (US)

(72) Inventors: Christopher Phanopoulos, Moorsel (BE); Servaas Holvoet, Veltem-Beisem (BE); Tugba Vardareli, Evere (BE); Steve Diamanti, The Woodlands, TX (US)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 377 days.

(21) Appl. No.: 14/411,928

(22) PCT Filed: Jun. 5, 2013

(86) PCT No.: PCT/EP2013/061543
§ 371 (c)(1),
(2) Date: Dec. 30, 2014

(87) PCT Pub. No.: WO2014/005779
PCT Pub. Date: Jan. 9, 2014

(65) Prior Publication Data
US 2015/0152196 A1 Jun. 4, 2015

(30) Foreign Application Priority Data
Jul. 5, 2012 (EP) ..................... 12175126

(51) Int. Cl.
| | | |
|---|---|---|
| *C08B 15/06* | (2006.01) | |
| *C08B 31/00* | (2006.01) | |
| *D06M 15/564* | (2006.01) | |
| *C08G 18/64* | (2006.01) | |
| *C08G 18/10* | (2006.01) | |
| *D06M 13/395* | (2006.01) | |
| *C08B 37/00* | (2006.01) | |
| *D21H 17/24* | (2006.01) | |
| *D06M 101/06* | (2006.01) | |
| *D06M 101/08* | (2006.01) | |

(52) U.S. Cl.
CPC .............. *C08B 15/06* (2013.01); *C08B 31/00* (2013.01); *C08B 37/00* (2013.01); *C08G 18/10* (2013.01); *C08G 18/6484* (2013.01); *D06M 13/395* (2013.01); *D06M 15/564* (2013.01); *D21H 17/24* (2013.01); *D06M 2101/06* (2013.01); *D06M 2101/08* (2013.01); *D06M 2400/01* (2013.01)

(58) Field of Classification Search
None
See application file for complete search history.

(56) References Cited

U.S. PATENT DOCUMENTS

| 2,562,978 A * | 8/1951 | Wolffan .................. C08B 31/00 |
| | | 536/2 |
| 2,993,888 A * | 7/1961 | Welch ..................... C08B 15/06 |
| | | 536/63 |
| 3,065,223 A * | 11/1962 | Brockway ............... C08B 31/00 |
| | | 106/205.01 |
| 4,046,725 A | 9/1977 | Pusineri |
| 4,521,544 A | 6/1985 | Kennedy |
| 4,912,205 A | 3/1990 | Okamoto et al. |
| 6,211,325 B1 | 4/2001 | Sun et al. |
| 2004/0157945 A1 | 8/2004 | Barber |
| 2009/0312452 A1 | 12/2009 | Awaji et al. |
| 2010/0179241 A1 | 7/2010 | Knoblock et al. |
| 2012/0165516 A1 | 6/2012 | Okamoto et al. |

FOREIGN PATENT DOCUMENTS

| CA | 2371543 A1 | 11/2000 |
| CN | 1541761 A | 11/2004 |
| WO | 01/70842 | 9/2001 |
| WO | 2010/079679 | 7/2010 |

OTHER PUBLICATIONS

Evans, Journal of Applied Polymer Science, vol. 37, 3291-3303, 1989.*
Jager, Biotechnology for Biofuels 2011, 4:33.*
Chavez-Murillo, Starch 60 (2008) 634-345.*
Doshi, Studies in Mercerization, thesis submitted to Shivaji University, Kolhapur, 2011, Chapter 7.*
Cotton Fiber Properties, https://www.barnhardtcotton.net/technology/cotton-properties/,. downloaded from the internet Mar. 8, 2017.*
Belhassen, Ramzi, et. al.; Preparation and Properties of Starch-Based Biopolymers Modified with Difunctional Isocyanates; BioResources; vol. 6 No. 1; pp. 81-102; 2011.

(Continued)

*Primary Examiner* — Layla D Berry
(74) *Attorney, Agent, or Firm* — Huntsman International LLC; Lewis Craft (57) ABSTRACT

The invention relates to a process for preparing a polysaccharide derivative, comprising the steps of: (a) contacting at least one polysaccharide with at least one polysaccharide swelling agent at a temperature of at most 70° C.; and (b) subsequently, contacting the product of step (a) with at least one aromatic isocyanate; thereby preparing a polysaccharide derivative.

14 Claims, 1 Drawing Sheet

(56) References Cited

OTHER PUBLICATIONS

Siqueira, Gilberto, et. al.; "New Process of chemical Grafting of Cellulose Nanoparticles with a Long Chain Isocyanate"; Langmuir; vol. 26 No. 1; pp. 402-411; 2009.
Kohler, Sarah, et. al.; "New Solvents for Cellulose: Dimethyl Sulfoxide/Ammonium Flourides"; Macromolecular Bioscience; vol. 7; pp. 307-314; 2007.
Vogt S., et. al.; "Effective Esterification of Carboxymethyl Cellulose in a New Non-Aqueous Swelling System"; Polymer Bulletin; vol. 36; pp. 549-555; 1996.
Wulin, Qui, et. al.; "Isocyanate as a Compatibilizing Agent on the Properties of highly Crystalline Cellulose/Polypropylene Composites"; Journal of Materials Science; vol. 40; pp. 3607-3614; 2005.
Vilar, Manual, et. al.; "Chemical Modification of Semiconductor Surfaces by means of Nanometric Cellulose Films"; J. Phys. Chem.; vol. 111; pp. 12792-12803; 2007.
Gandini, Alessandro, et. al.; "Activation of Solid Polymer Surfaces with Bifunctional Reagents"; Polymer International; vol. 50; pp. 7-9; 2001.
Rui-He, A study on grafting poly(1,4-dioxan-2-one) onto starch via 2,4-tolylene diisocyanate, Carbohydrate Polymers, 65 (2006), p. 28-34.

\* cited by examiner

PROCESS FOR PREPARING DERIVATIZED POLYSACCHARIDES

This application is the National Phase of International Application PCT/EP2013/061543 filed Jun. 5, 2013 which designated the U.S. and which claims priority to Foreign Application No. 12175126.7 filed Jul. 5, 2012. The noted applications are incorporated herein by reference.

The present invention relates to processes for preparing polysaccharide derivatives and to the thus obtained polysaccharide derivatives.

Cellulose is a fibrous, tough, water-insoluble substance which can be found in the protective (cell) wall of plants. It is a polysaccharide that is mainly composed of [beta]-D-gluco-pyranose units linked by 1-4 glycosidic bonds. From a structural perspective, cellulosic chains are arranged into microfibrils during crystallization with the formation of chain-stiffening inter-molecular hydrogen bonds. Different crystalline allomorphs of cellulose are known.

The hydroxyl groups in cellulosic substrates are involved in a number of intra- and intermolecular hydrogen bonds and generally show limited reactivity as nucleophilic moieties. As a consequence, chemical derivatization of these hydroxyl groups is extremely difficult. Even towards highly reactive molecules (such as e.g. isocyanates), these hydroxyl groups show no or very little reactivity. Another disadvantage of these cellulosic materials is their high melting point, usually higher than the thermal decomposition temperature, which limits their derivatization potential in liquid phase.

Traditional approaches in chemical derivatization of cellulose make use of chemically and/or physically harsh conditions (chemicals, temperature, pressure, pH, . . . ) to dissolve or derivatize cellulose. This impacts the bulk structure and related properties (such as crystallinity) of the substrates. These current solutions have mainly focused on decreasing or eliminating the hydrogen bonding pattern in the cellulosic substrate, as discussed below.

Sometimes, the problem is merely ignored. In these cases, the cellulose may act as a non-reactive 'filler'.

One option is to alkoxylate the cellulosic substrate in order to increase its solubility and compatibility with the derivatization agent. Alkoxylation impacts crystallinity, adds capital costs and moreover, is associated with EHS risks.

Another possibility is the use of mono-, di- and/or oligosaccharides which possess different solubility characteristics. However, such use is limited in some applications when the bulk properties of the cellulosic substrates are required (e.g. composites).

Another option is to break down the hydrogen bonding network.

Frequently applied methods chemically digest the cellulosic substrates by sulfite or alkali processes (caustic soda, dilute NaOH) at elevated temperatures in pressure vessels (degradation, lower molecular weight, decreased crystallinity). However, the aqueous medium or residual moisture, which is often bound into the hydrogen network, is incompatible with isocyanate chemistry and causes side reactions. In addition, residues of the digesting medium (e.g. Na and/or K cations) can be released and can cause side reactions with isocyanates (e.g. isocyanurates). Furthermore, the degradation of the structure leads to a deterioration of the cellulosic properties.

The hydrogen bond network may also be partially or completely destroyed by using mechanical treatments (for example: grinding, milling, etc), wherein mechanical energy may tear apart the microfibrils in order to degrade the cellulosic substrate. This leads to a reduced molecular weight and higher amorphous content. However, mechanical treatments damage the cellulosic bulk structure, which in turn may negatively affect molecular weight, fiber strength and stiffness, etc.

Alternatively, steam explosion can be applied to break down the cellulosic substrate in harsh pressure and temperature conditions. This procedure requires an extra drying step and, in addition, is known to reduce the crystalline content of the substrates.

Therefore, there remains a need for processes for preparing functionalized polysaccharides that overcome one or more of the aforementioned issues. It is an object of the present invention to provide a process for preparing a functionalized polysaccharide. It is also an object of the invention to provide a functionalized polysaccharide while maintaining, or only minimally reducing, the polysaccharide bulk properties, such as crystallinity.

The present inventors have now surprisingly found that one or more of these objects can be obtained by a process for preparing a polysaccharide derivative according to the invention. The polysaccharide derivative is obtained by pre-contacting the polysaccharide with a compound, before adding an aromatic isocyanate for functionalization, said pre-contacting step being performed at a temperature of at most 70° C. The polysaccharide derivative can comprise pendant free isocyanate groups which enable the polysaccharide to be further derivatized, and/or to improve the compatibility of the polysaccharide particles with isocyanate based liquids. The polysaccharide derivatives can subsequently be used in different applications by further reaction/derivatization with other isocyanate-reactive functionalities, such as substrates, specialty chemicals, and polyurethane components.

The present invention encompasses a process for preparing a polysaccharide derivative, the process comprising the steps of:
(a) contacting at least one polysaccharide with at least one polysaccharide swelling agent, preferably selected from the group comprising sulfoxides, formamides, acetamides, pyrrolidones, pyridines, imidazoles and mixtures thereof, at a temperature of at most 70° C.; and
(b) subsequently, contacting the product of step (a) with at least one aromatic isocyanate;
thereby preparing a polysaccharide derivative Preferably, the polysaccharide derivative prepared according to the present invention comprises the reaction product of:
a) at least one polysaccharide with a degree of polymerization of at least 5; and
b) at least one aromatic isocyanate;
and the crystallinity index CI of the polysaccharide derivative, as measured by XRD, is at least 5%.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, which illustrates, by way of example, the principles of the invention.

It is to be understood that this invention is not limited to particular embodiments described, since such embodiments may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise. By way of example, "an isocyanate group" means one isocyanate group or more than one isocyanate groups.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Throughout this application, the term "about" is used to indicate that a value includes the standard deviation or error for the device or method being employed to determine the value.

As used herein, the terms "% by weight", "wt %", "weight percentage", or "percentage by weight" are used interchangeably.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The term "alkyl" as a group or part of a group as used herein refers to branched or straight (linear) or cyclic hydrocarbon with no site of unsaturation, preferably having at least 4 carbon atoms in the chain. When a subscript is used herein following a carbon atom, the subscript refers to the number of carbon atoms that the named group may contain. Thus, for example, $C_{1-20}$ alkyl means an alkyl of 1 to 20 carbon atoms. Examples of alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers.

The term "alkenyl" as a group or part of a group as used herein refers to a branched or straight or cyclic hydrocarbon with at least one site (usually 1 to 3, preferably 1) of unsaturation, namely a carbon-carbon, sp2 double bond, preferably having at least 4 carbon atoms in the chain. The double bond may be in the cis or trans configuration. $C_{1-20}$ alkenyl means an alkenyl of 1 to 20 carbon atoms.

As used herein, the term "$C_{3-6}$ cycloalkyl", by itself or as part of another substituent, refers to a saturated or partially saturated cyclic alkyl radical containing from about 3 to about 6 carbon atoms. Examples of $C_{3-6}$ cycloalkyl include cyclopropyl, cyclobutyl, cyclopentyl, or cyclohexyl.

As used herein, the term "$C_{6-10}$ aryl", by itself or as part of another substituent, refers to a polyunsaturated, aromatic hydrocarbyl group having a single ring (i.e. phenyl) or multiple aromatic rings fused together (e.g. naphthyl) or linked covalently, typically containing from 6 to 10 carbon atoms, wherein at least one ring is aromatic. $C_{6-10}$ aryl is also intended to include the partially hydrogenated derivatives of the carbocyclic systems enumerated herein. Non-limiting examples of aryl comprise phenyl, naphthyl, indanyl, or 1,2,3,4-tetrahydro-naphthyl.

As used herein, the term "$C_{6-10}$ aryl $C_{1-6}$ alkyl", by itself or as part of another substituent, refers to a $C_{1-6}$ alkyl group as defined herein, wherein a hydrogen atom is replaced by a $C_{6-10}$ aryl as defined herein. Examples of $C_{6-10}$ aryl $C_{1-6}$ alkyl radicals include benzyl, phenethyl, dibenzylmethyl, methylphenylmethyl, 3-(2-naphthyl)-butyl, and the like.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The present invention encompasses a process for preparing a polysaccharide derivative, the process comprising the steps of:
(a) contacting at least one polysaccharide with at least one compound, at a temperature of at most 70° C., preferably at room temperature; and
(b) subsequently, contacting the product of step (a) with at least one aromatic isocyanate;
thereby preparing a polysaccharide derivative.

The at least one compound may be any polysaccharide swelling agent essentially in the absence of water. The at least one compound may be any polysaccharide swelling agent that is not isocyanate reactive. Preferably, the at least one compound is selected from the group comprising sulfoxides, formamides, acetamides, pyrrolidones, pyridines, imidazoles and mixtures thereof.

In an embodiment, the present invention encompasses a process for preparing a polysaccharide derivative, the process comprising the steps of:
(a) contacting at least one polysaccharide with at least one compound selected from the group comprising sulfoxides, formamides, acetamides, pyrrolidones, pyridines, imidazoles and mixtures thereof, at a temperature of at most 70° C., preferably at room temperature; and (b) subsequently, reacting the product of step (a) with at least one aromatic isocyanate;

thereby preparing a polysaccharide derivative.

Preferably, the at least one compound is present in an amount of at least 25% by weight, preferably at least 50%, preferably at least 75%, for example at least 90%, for example at least 95%, based on the total weight of the polysaccharide and the compound combined.

In a preferred embodiment, the at least one polysaccharide in step (a) is present in an amount ranging from 0.5 to 99.0% by weight, based on the total weight of the at least one polysaccharide and the at least one compound combined. Preferably, the at least one polysaccharide in step (a) is present in an amount ranging from 2.0 to 70.0 by weight, even more preferably ranging from 5.0 to 50.0% by weight, based on the total weight of the at least one polysaccharide and the at least one compound combined.

Step (a) of the process according to the invention comprises contacting at least one polysaccharide with at least one compound which cause swelling but which do not react with isocyanates, preferably said compound being selected from the group comprising sulfoxides, formamides, acetamides, pyrrolidones, pyridines, imidazoles, and mixtures thereof. Said step is performed at a temperature below 70° C., preferably at a temperature below 60° C., preferably at a temperature below 50° C., preferably at a temperature below 40° C., preferably at room temperature. As used herein, the term "room temperature" refers to a temperature of from 15 to 35° C.

Step (a) may cause swelling of the at least one polysaccharide. Without being bound to the theory, swelling can make the surface hydroxyl moieties more accessible for reaction with derivatization agents. Preferably, such a swelling procedure is a reversible step and enables full regeneration of the crystalline structure.

As used herein, the term "sulfoxide" refers to compounds comprising a sulfur atom covalently linked to three atoms, at least one of which is an oxygen atom; the formal oxidation state of said sulfur atom is (IV). Preferred sulfoxides have the general structure of formula (1):

$$S(O)R_1R_2 \quad (1)$$

wherein $R_1$ and $R_2$ are independently selected from the group comprising hydrogen, $C_{1-20}$ alkyl, $C_{1-20}$ alkenyl, $C_{6-10}$ aryl, $C_{3-6}$ cycloalkyl, and $C_{6-10}$ aryl $C_{1-6}$ alkyl, optionally substituted with heteroatoms. Examples of preferred $R_1$ and $R_2$ include $C_{1-20}$ alkyl, phenyl and benzyl. Preferably, the at least one compound is dimethyl sulfoxide (DMSO).

As used herein, the term "formamide" refers to compounds comprising the —NC(O)H formamide group. Preferred formamides have the general structure of formula (2):

$$HC(O)NR_{21}R_{22} \quad (2)$$

wherein $R_{21}$ and $R_{22}$ are independently selected from the group comprising hydrogen or $C_{1-20}$ alkyl. In an embodiment, the at least one compound is N,N-dimethyl formamide (DMF).

As used herein, the term "acetamide" refers to compounds comprising the —NC(O)CH$_3$ functional group. Preferred acetamides have the general structure of formula (3):

$$HC(O)NR_{31}R_{32} \quad (3)$$

wherein $R_{31}$ and $R_{32}$ are independently selected from the group comprising hydrogen or $C_{1-20}$ alkyl. In an embodiment, the at least one compound is N,N-dimethyl acetamide (DMAc).

As used herein, the term "pyrrolidones" refers to the compound with the chemical formula $C_4H_7NO$, optionally substituted with $C_{1-20}$ alkyl and/or halogens.

As used herein, the term "pyridines" refers to the compound with the chemical formula $C_5H_5N$, optionally substituted with $C_{1-20}$ alkyl and/or halogens.

As used herein, the term "imidazole" refers to the compound with the chemical formula $C_3H_4N_2$, optionally substituted with $C_{1-20}$ alkyl and/or halogens.

In a preferred embodiment, the at least one compound is selected from the group comprising: dimethyl sulfoxide, diethyl sulfoxide, ethylmethyl sulfoxide, N,N-dimethyl formamide, N,N-diethyl formamide, N,N-ethylmethyl formamide, N-methyl-pyrrolidone, pyridine, bromo-pyridine, chloro-pyridine, N,N-dimethyl acetamide. N,N-diethyl acetamide, N,N-ethylmethyl acetamide, 1,3-dimethyl-2-imidazolidinone, imidazolidinone, 1-methyl-2-imidazolidinone, 1-ethyl-2-imidazolidinone, 1-allyl-3-methylimidazolium chloride, 1-butyl-3-methylimidazolium chloride, 1-ethyl-3-methylimidazolium chloride, and mixtures thereof. In a preferred embodiment, the compound is dimethyl sulfoxide (DMSO).

In an alternative embodiment, the at least one compound may be any compound that is not isocyanate reactive. Preferably, the at least one compound may be any compound that does not break strong hydrogen bonds. For example, the at least one compound may be an ionic liquid. Preferably, the at least one compound is essentially free of any compounds that are isocyanate reactive. Preferably, the at least one compound is essentially free of any compounds that break strong hydrogen bonds. For example, the at least one compound may be essentially free of LiCl.

In a preferred embodiment, the at least one compound is anhydrous. Preferably, the at least one compound is anhydrous DMSO. In a preferred embodiment, the water content in the at least one polysaccharide, the at least one isocyanate and the at least one compound is at most 0.5% by weight, preferably at most 0.4% by weight, more preferably at most 0.2% by weight.

In a preferred embodiment, step (a) is preceded by the step of drying the polysaccharide, preferably under vacuum.

In some embodiments, this drying step is performed at a temperature ranging from 40 to 100° C., preferably about 60° C.

In some embodiments, this drying step is performed for at least 0.5 hrs, preferably at least 1 hr, preferably at least 2 hrs, preferably at least 6 hrs, preferably about 12 hrs.

In a preferred embodiment, step (a) is performed for a time period of at least 30 minutes before step (b). Preferably, step (a) comprises contacting the least one polysaccharide with the at least one compound for at least 3 hours, more preferably for at least 2 hours, more preferably for at least 1 hour. In some embodiments, step (a) comprises contacting the at least one polysaccharide with the at least one compound for a time ranging from 0.5 to 24 hrs, preferably from 0.5 to 12 hrs, preferably from 0.5 to 3 hrs. The aforementioned times are preferred times for temperatures of at most 50° C. For higher temperatures, step (a) may be shorter. It is preferred that the time and temperature in step (a) does not result in complete dissolution of the polysaccharide. For example, at a temperature of from 50° C. to 60° C., step (a) is performed for a time period of at most 2 hours, for example of from 0.5 to 2 hours. Preferably, at a temperature of from 60° C. to 70° C., step (a) is performed for a time period of at most 1 hour, for example of from 0.5 to 1 hour.

Step (b) of the process according to the invention comprises reacting the product of step (a) with at least one aromatic isocyanate. For example, step (b) of the process according to the invention comprises contacting or mixing the product of step (a) with at least one aromatic isocyanate.

Preferably, step (b) is performed in contact with the same at least one compound as step (a).

In some embodiments, step (b) comprises contacting, mixing and/or reacting the product of step (a) with at least one aromatic isocyanate for at least 15 minutes, more preferably for at least 30 minutes, more preferably for at least 1 hour, most preferably for about 4 hours. In some embodiments, step (b) comprises contacting, mixing and/or reacting the product of step (a) with at least one aromatic isocyanate for a time ranging from 15 minutes to 24 hrs, preferably from 30 minutes to 12 hrs, more preferably from 1 to 12 hrs.

In some embodiments, the temperature in step (b) ranges from 25 to 125° C., more preferably from 25 to 80° C., most preferably from 25 to 50° C.

In a preferred embodiment, the mixture in step (b) is agitated, for example stirred or shaken.

In some embodiments, step (b) comprises mixing the product of step (a) with at least one catalyst. Preferably, the catalyst is an organometallic catalyst. Any other step can also be performed in the presence of a catalyst.

In some embodiments, the catalyst is an organometallic catalyst. In these embodiments, the catalyst comprises an element selected from the group comprising tin, iron, lead, bismuth, mercury, titanium, hafnium, zirconium, and combinations thereof. In certain embodiments, the catalyst comprises a tin catalyst. Suitable tin catalysts, for purposes of the present invention, may be selected from tin(II) salts of organic carboxylic acids, e.g. tin(II) acetate, tin(II) octoate, tin(II) ethylhexanoate and tin(II) laurate. In an embodiment, the organometallic catalyst comprises dibutyltin dilaurate, which is a dialkyltin(IV) salt of an organic carboxylic acid. The organometallic catalyst can also comprise other dialkyltin(IV) salts of organic carboxylic acids, such as dibutyltin diacetate, dibutyltin maleate and dioctyltin diacetate. Specific examples of suitable organometallic catalyst, e.g. dibutyltin dilaurates, for purposes of the present invention, are commercially available from Air Products and Chemicals, Inc. under the trademark of DABCO®. Preferred catalysts according to the invention are dibutyl tin dilaurate, dibutyl tin diacetate, dioctyl tin diacetate, and tin octoate.

Non-limiting examples of other suitable catalysts, may be selected from the group comprising iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups; triethylamine, N,N,N',N'-tetramethylethylenediamine, N,N-dimethylaminopropylamine, N,N,N',N',N''-pentamethyldipropylenetriamine, tris(dimethylaminopropyl)amine, N,N-dimethylpiperazine, tetramethylimino-bis(propylamine), dimethylbenzylamine, trimethyl amine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino) propylimidazole, N,N,N-dimethylaminopropylhexahydrotriazine, potassium acetate, N,N,N-trimethyl isopropyl amine/formate, and combinations thereof. It is to be appreciated that the catalyst component may include any combination of two or more of the aforementioned catalysts.

Preferably, the catalyst is present in an amount of at least 10 ppm, for example at least 0.01% by weight, for example at least 0.20% by weight, with % by weight based on the total weight of the isocyanate.

In some embodiments the catalyst is present in at most 5% by weight, based on the weight of the isocyanate.

In some embodiments of the invention, the process according to the invention comprises one or more additional steps, such as washing steps, drying steps or flushing steps.

The process of the present invention provides a polysaccharide derivative comprising the reaction product of at least one polysaccharide with at least one aromatic isocyanate, wherein the at least one polysaccharide preferably has a degree of polymerization of at least 5, and the polysaccharide derivative preferably has a crystallinity index (CI) as measured by XRD, of at least 5%.

As used herein the terms "polysaccharide derivative", "modified polysaccharide" and "functionalized polysaccharide" are synonymous and used interchangeably and refer to an isocyanate functionalized polysaccharide. The reaction product may be obtained by adding, reacting, contacting or mixing the different components.

According to one embodiment the polysaccharide derivative, obtained by the process of the present invention, comprises a polysaccharide backbone and one or more pendant groups attached to the polysaccharide backbone via a carbamate —O—C(=O)—NH— link. Such a carbamate link may be formed by the reaction of a free isocyanate —N=C=O group with a hydroxyl group of a polysaccharide backbone.

According to another embodiment the polysaccharide derivative, obtained by the process of the present invention, comprises a polysaccharide backbone and one or more pendant groups attached to the polysaccharide backbone via an urea —NH—C(=O)—NH— link. Such an urea link may be formed by the reaction of a free isocyanate —N=C=O group with an amine group of a polysaccharide backbone.

According to yet another embodiment the polysaccharide derivative, obtained by the process of the present invention, comprises a polysaccharide backbone and one or more pendant groups attached to the polysaccharide backbone via an allophanate —NH—C(=O)—N(—C(=O)—O—)— link. Such an allophanate link may be formed by the reaction of a free isocyanate —N=C=O group with a urethane group of a polysaccharide backbone.

According to yet another embodiment the polysaccharide derivative, obtained by the process of the present invention, comprises a polysaccharide backbone and one or more pendant groups attached to the polysaccharide backbone via a biuret —NH—C(=O)—N(—C(=O)—NH—)— link. Such a biuret link may be formed by the reaction of a free isocyanate —N=C=O group with an urea group of a polysaccharide backbone.

Preferably the one or more pendant groups comprise at least one free isocyanate —N=C=O group, which may be used for further functionalization. Preferably, the degree of polymerization of the polysaccharide backbone is at least 5. Preferably, the crystallinity index CI of the polysaccharide derivative, as measured by XRD, is at least 5%.

The NCO content of the polysaccharide derivative can be ranging from 0% to 10% as measured according to DIN 53185. In some embodiments, the NCO content of the polysaccharide derivative is at least 0.2%, For example, the NCO content can be ranging from 0.2% to 5.0%, for example from 0.2% to 3.0%.

As used herein, the term "polysaccharide" refers to compounds comprising at least 5 monomer saccharide sub-units joined together by glycosidic bonds.

Preferably, the at least one polysaccharide has a degree of polymerization of at least 10, more preferably of at least 20, more preferably of at least 50, for example of at least 100, for example of at least 150, for example of at least 200, for example of at least 500.

The at least one polysaccharide may be natural or synthetic. The at least one polysaccharide may be crude or purified. The at least one polysaccharide may be original or (partially) pre-derivatized or modified. The at least one polysaccharide may be linear, branched or cyclic. The at least one polysaccharide may be a homopolysaccharide (also referred to as homoglycan) or a heteropolysaccharide (also referred to as heteroglycan).

Preferably, the at least one polysaccharide is hexose based, i.e. the at least one polysaccharide comprises at least one hexose sub-unit. Preferably the at least one polysaccharide comprises at least 50% by weight of hexose sub-units, based on the total weight of the polysaccharide, more preferably at least 75% by weight, more preferably at least 90% by weight. Preferably the at least one polysaccharide is cyclic hexose based.

In a preferred embodiment, the at least one polysaccharide comprises at least one glucose sub-unit. Preferably the at least one polysaccharide comprises at least 50% by weight of glucose sub-units, based on the total weight of the polysaccharide, more preferably at least 75% by weight, more preferably at least 90% by weight. The glucose sub-units may be modified glucose sub-units, for example amino-glucose sub-units, with a substituent on the C2 or C3 position.

In some embodiments, the at least one polysaccharide is selected from the group comprising: cellulosic compounds; starches (such as amylose or amylopectin or mixtures thereof); agarose; alginic acid; alguronic acid; alpha glucan; amylopectin; amylose; arabinoxylan; beta-glucan; callose; capsulan; carrageenan; cellodextrin; cellulin; chitin; chitosan; chrysolaminarin; curdlan; cyclodextrin; DEAE-sepharose; dextran; dextrin; alpha-cyclodextrin; ficoll; fructan; fucoidan; galactoglucomannan; galactomannan; gellan gum; glucan; glucomannan; glycocalyx; glycogen; hemicellulose; hypromellose; icodextrin; kefiran; laminarin; lentinan; levan; lichenin; maltodextrin; mixed-linkage glucan; mucilage; natural gum; oxidized cellulose; paramylon; pectic acid; pectin; pentastarch; pleuran; polydextrose; polysaccharide peptide; porphyran; pullulan; schizophyllan; sepharose; sinistrin; sizofiran; sugammadex; welan gum; xanthan gum; xylan; xyloglucan; zymosan; glycosaminoglycans such as glycosaminoglycan, chondroitin, chondroitin sulfate, dermatan sulfate, heparan sulfate, heparin, heparinoid, hyaluronan, keratan sulfate, restylane, sodium hyaluronate, and sulodexide; and mixtures thereof. In preferred embodiments, the at least one polysaccharide is selected from the group comprising cellulosic compounds and starches, In an embodiment, the at least one polysaccharide is a starch selected from the group comprising: corn starch, amylose, acetylated distarch adipate, amylomaize, amylopectin, cyclodextrin, dextrin, dialdehyde starch, erythronium *japonicum*, high-fructose corn syrup, hydrogenated starch hydrosylate, hydroxyethyl starch, hydroxypropyl distarch phosphate, maltitol, maltodextrin, maltose, pentastarch, phosphated distarch phosphate, potato starch, starch, waxy corn, waxy potato starch, and mixtures thereof.

In an embodiment, the at least one polysaccharide is a cellulosic compound selected from the group comprising: cellulose, nanocellulose, art silk, bacterial cellulose, bamboo fibre, carboxymethyl cellulose, cellodextrin, cellophane, celluloid, cellulose acetate, cellulose acetate phthalate, cellulose triacetate, cellulosome, cotton, croscarmellose sodium, crystalate, ciethylaminoethyl cellulose, dissolving pulp, ethulose, ethyl cellulose, fique, hydroxyethyl cellulose, hydroxyethyl methyl cellulose, hydroxypropyl cellulose, hypromellose, lyocell, mercerised pulp, methyl cellulose, microbial cellulose, microcrystalline cellulose, modal (textile), nitrocellulose, parkesine, pearloid, pulp, paper, rayon, sodium cellulose phosphate, supima, viscose, vulcanized fibre, wood fibre, and mixtures thereof.

In a preferred embodiment, the polysaccharide is cellulose or starch. As used herein, the term "cellulose" refers to a polysaccharide comprising a linear chain of several hundred to over ten thousand β(1→4) linked D-glucose units.

The polysaccharide derivative, obtained by the process of the present invention, comprises the reaction product of the at least one polysaccharide with at least one aromatic isocyanate.

As used herein, the term isocyanate comprises any compound comprising at least one isocyanate —N=C=O group, whereby the isocyanate group may be a terminating group. Preferably, the isocyanate group is a terminating group. Isocyanate compounds are preferably polyisocyanate compounds. Suitable polyisocyanates used may be araliphatic and/or aromatic polyisocyanates, typically of the type R—(NCO)$_x$ with x being at least 1, preferably at least 2, and R being an aromatic or combined aromatic/aliphatic group. Examples of R are diphenylmethane, toluene, or groups providing a similar polyisocyanate.

In a preferred embodiment, the isocyanate is a polyisocyanate. Due to partial surface crosslinking (intra and interstrand crosslinking between cellulosic chains) by the polyisocyanate, the bulk of the cellulosic substrate may be protected against further derivatization. In this way, the crystalline, stiff nature of the cellulosic backbone may be preserved for further applications, in which the bulk properties of the cellulosic are required (e.g. for composites). Free isocyanate groups may also be used for further functionalization or derivatization. The free isocyanate groups of polyisocyanates may also trimerize to form isocyanurates groups.

In a preferred embodiment, the at least one isocyanate is a polyisocyanate selected from the group comprising: methylene diphenyl diisocyanate in the form of its 2,4'-, 2,2'- and 4,4'-isomers and mixtures thereof, the mixtures of methylene diphenyl diisocyanates and oligomers thereof, or their derivatives having a urethane, isocyanurate, allophonate, biuret, uretonimine, uretdione and/or iminooxadiazinedione groups and mixtures thereof; toluene diisocyanates and isomer mixtures thereof; tetramethylxylene diisocyanate; 1,5-naphtalenediisocyanate; p-phenylenediisocyanate; tolidine diisocyanate; or mixtures of these organic polyisocyanates, and mixtures of one or more of these organic polyisocyanates with methylene diphenyl diisocyanate in the form of 2,4'-, 2,2'- and 4,4'-isomers and mixtures thereof, the mixtures of methylene diphenyl diisocyanate and oligomers thereof.

In an embodiment, the at least one isocyanate is the reaction product of polyisocyanates (e.g. polyisocyanates as set out above), with components containing isocyanate-reactive hydrogen atoms forming polymeric polyisocyanates or so-called prepolymers. The prepolymer can be generally prepared by reacting a polyisocyanate with isocyanate reactive components which are typically components containing isocyanate-reactive hydrogen atoms, such as a hydroxyl terminated polyether (polyether polyols), a hydroxyl terminated polycarbonate or mixture thereof, and hydroxyl terminated polyesters (polyester polyol). Non-limiting examples of suitable polyether polyols are preferably polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof, preferably having a functionality of at least 2, for example from 2 to 6. Hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, polypropylene glycol) comprising propylene oxide reacted with propylene glycol, poly(tetramethyl glycol) (PTMG) comprising water reacted with tetrahydrofuran (THF). Polyether polyols can further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of glycerol and ethylene oxide or glycerol and propylene oxide. The various polyether intermediates generally have a number average molecular weight (Mn), as determined by assay of the terminal functional groups which is an average molecular weight, of from about 200 to about 10000, desirably from about 200 to about 5000, and preferably from about 200 to about 3000. According to embodiments, the polyether polyols are EO-tipped polyether polyol. Suitable EO-tipped polyether polyol comprises polyether polyol having a structure I—[R—(CH$_2$CH$_2$O)$_p$H]$_x$, wherein x is an integer equal or more than 1, p is a number varying from 1 to 100, I is an initiator and R represents a series of epoxides, the (CH$_2$CH$_2$O)$_p$H groups being bound to R via an ether bond. The initiator I may be an alcohol, an amine, a polyalcohol, a polyamine or a component comprising one or more alcohol groups and one of more amine groups.

In a preferred embodiment, the isocyanate comprises MDI. Preferably, the MDI is in the form of its 2,4'-, 2,2'- and 4,4'-isomers and mixtures thereof, or in the form of the mixtures of diphenylmethane diisocyanates (MDI) and oligomers thereof. In some embodiments, the MDI is in the form of its 2,4' and 4,4'-isomers and mixtures thereof, or in the form of the mixtures of these diphenylmethane diisocyanates (MDI) and oligomers thereof. In some embodiments, the MDI is in the form of its 2,4' isomer, or in the form of the mixtures of the 2,4' isomer and oligomers thereof. The use of 2,4'-MDI containing isocyanates partially inhibits crosslinking between two cellulosic chains compared to the use of pure 4,4'-MDI, which results in more crosslinking. So by the choice of the initial MDI type, the amount of pendant isocyanates and extent of crosslinking can be tailored. Preferably, the at least one isocyanate is a mixture of 2,4'- or 4,4'-MDI. In some embodiments, the polyisocyanate comprises a polymeric polyisocyanate. In some embodiments, the polyisocyanate comprises a high functionality polymeric polyisocyanate, with a functionality of at least 2.5, preferably at least 2.7. As used herein, the term "functionality" refers to the average number of isocyanate groups per molecule, averaged over a statistically relevant number of molecules present in the isocyanate.

In some embodiments, the at least one isocyanate comprises a polymeric methylene diphenyl diisocyanate.

The polymeric methylene diphenyl diisocyanate can be any mixture of pure MDI (2,4'-, 2,2'- and 4,4'-methylene diphenyl diisocyanate) and higher homologues thereof.

The polysaccharide derivative obtained by the process of the present invention may be used in fillers, fibers, packaging, films, foams, composites, adhesives, coatings, textiles, sealants, rheology modifiers, paints, chromatography packing (solid phase) etc. For example, the polysaccharide derivative may be used in fillers (as granules), fibers, or textiles.

In a preferred embodiment, the polysaccharide derivative is in the form of granules, wherein the granules have a particle size distribution wherein the D50 is at most 1.0 mm, preferably at most 200 micron, more preferably at most 100 micron and in the most preferred embodiment at most 50 micron, wherein D50 is defined as the particle size for which fifty percent by weight of the particles has a size lower than the D50. For example, the D50 (and/or D90 or D95) can be measured by sieving, by BET surface measurement, or by laser diffraction analysis, for example according to standard ISO 13320:2009.

In a preferred embodiment, the polysaccharide derivative is in the form of a yarn or fiber, with a linear mass density of at most 2000 denier, preferably between 5 and 2000 denier, preferably between 5 and 500 denier, and in the most preferred embodiment between 5 and 200 denier.

In a preferred embodiment, the polysaccharide derivative is in the form of a textile or fabric, wherein the textile or fabric may be woven or unwoven.

The crystallinity of the polysaccharide derivative, as measured by XRD, is preferably at least 5%. Preferably, the crystallinity of the polysaccharide derivative, as measured by XRD, is at least 10%, preferably at least 20%, preferably at least 30%. The crystallinity index (CI) of the at least one polysaccharide may be at least 10%, for example at least 20%, for example at least 30%, for example at least 40%, for example at least 50%, for example at least 60%, for example at least 70%, for example at least 80%.

In an embodiment, the at least one polysaccharide is cellulose and the crystallinity of the polysaccharide derivative, as measured by XRD, is at least 10%, preferably at least 20%, preferably at least 30%, preferably at least 40%, preferably at least 50%, preferably at least 60%.

In an embodiment, the at least one polysaccharide is a starch and the crystallinity of the polysaccharide derivative, as measured by XRD, is at least 5%, preferably at least 10%, preferably at least 15%, preferably at least 20%.

In some embodiments, the crystallinity index of the polysaccharide derivative is at least 50% that of the at least one polysaccharide, preferably at least 60%, preferably at least 70%, preferably at least 80%.

The polysaccharide derivative obtained by the process of the present invention can be further reacted into a prepolymer. The prepolymer can be generally prepared by reacting the polysaccharide derivative with isocyanate reactive components which are typically components containing isocyanate-reactive hydrogen atoms, such as a hydroxyl terminated polyether (polyether polyols), a hydroxyl terminated polycarbonate or mixture thereof, and hydroxyl terminated polyesters (polyester polyol).

EXAMPLES

The examples described hereunder illustrate the properties of the processes and polysaccharide derivatives according to embodiments of the present invention. Unless otherwise indicated, all parts and all percentages in the following examples, as well as throughout the specification, are parts by weight or percentages by weight respectively.

Methods

The following methods were used in the examples:

FT-IR analysis (in ATR mode) was used to identify urethane stretch modes and isocyanate stretch modes.

The NCO content of the polysaccharide derivative was determined by titration according to DIN 53185.

The crystallinity index (CI) was measured by XRD analysis as described below:

The crystallinity was measured by X-Ray Diffraction, using CuKα radiation generated at 45 kV and 36 mA. The CuKα radiation consists of Kα1 (0.15406 nm) and Kα2 (0.15444 nm) components.

Figure 1:
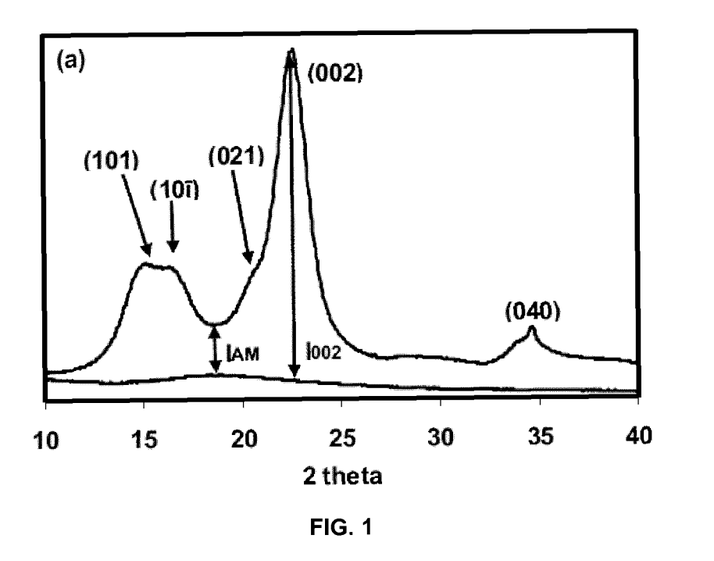
FIG. 1 represents an X-ray diffraction spectrum of cellulose (Avicel PH-101).

For the cellulose based derivative of example 1 (and comparative examples 2-3), the CI was calculated from the height ratio between the intensity of the crystalline peak (I002-IAM) and total intensity (I002) after subtraction of the background signal measured without cellulose. The X-ray diffraction spectrum of Avicel PH-101 is given in FIG. 1.

Figure 2:
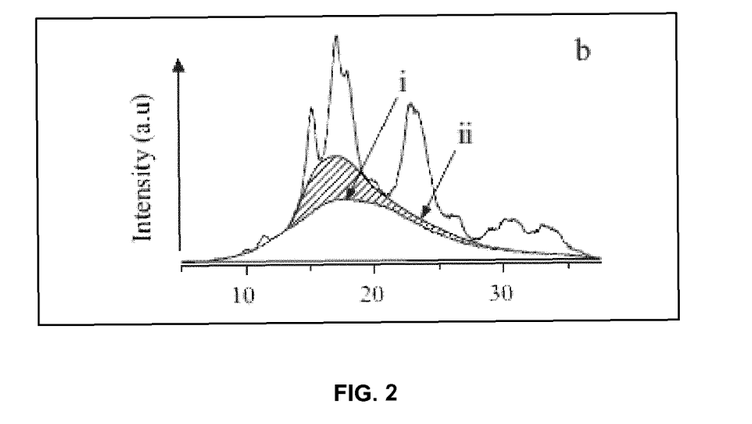
FIG. 2 represents an X-ray diffraction spectrum of corn starch.

For the starch based derivative of example 4 (and comparative example 5), crystallinity was quantified by fitting a smooth curve under the main minima of diffractograms (see line i). The area above the smooth curve was taken to correspond to the crystalline portion. The ratio of upper area to total diffraction area was taken as the degree of crystallinity. The X-ray diffraction spectrum of starch is given in FIG. 2.

Example 1

Microcrystalline cellulose (Avicel®) was dried under vacuum at 60° C. for 12 hours and weighted into a reaction flask Anhydrous dimethyl sulfoxide (DMSO) was added and the mixture (20 wt % microcrystalline cellulose) was stirred at room temperature for 1 hour. Isocyanate (a mixture of 50% 4,4'-MDI and 50% 2,4'-MDI) was added to the reaction flask while blanketing with nitrogen and stirring vigorously at room temperature (1.05 mole of MDI per mole of OH) for 1 hour. The polysaccharide derivative was filtered off and washed with dry acetonitrile. The polysaccharide derivative was then dried under vacuum and filled into containers flushed with nitrogen.

FT-IR analysis of the derivative exhibited a urethane stretch at 1730 cm$^{-1}$ and an isocyanate stretch at 2275 cm$^{-1}$.

The NCO content of the polysaccharide derivative was NCOv=1.7+/−0.1 w %.

The crystallinity index (CI) of neat microcrystalline Avicel® and of the polysaccharide derivative was measured. The CI of cellulose was 85%, and the CI of the polysaccharide derivative prepared in this example was 82%. This shows that this process for preparing the polysaccharide derivative had limited effects on the bulk crystallinity and related bulk properties of the polysaccharide.

Comparative Example 2

Microcrystalline cellulose (Avicel®) was dried under vacuum at 60° C. for 12 hours and weighted into a reaction flask. Isocyanate (a mixture of 50% 4,4'-MDI and 50% 2,4'-MDI) was added to the reaction flask while blanketing with nitrogen and stirring vigorously at room temperature (1.05 mole of MDI per mole of OH) for 1 hour. The material was filtered off and washed with dry acetonitrile. The material was then dried under vacuum and filled into containers flushed with nitrogen.

The NCO content was NCOv=0.1 w %. FT-IR analysis (in ATR mode) exhibited a spectrum identical to the cellulose reference spectrum, showing that the cellulose was not derivatized with the process of the comparative example.

Comparative Example 3

Microcrystalline cellulose (Avicel®) was dried under vacuum at 60° C. for 12 hours and weighted into a reaction flask. A 1 wt % solution of microcrystalline cellulose was made by adding 4 wt % lithium chloride in 1,3-dimethyl-2-imidazolidinone to the reaction flask, and heating the mixture for 1 hour at 140° C. while blanketing with nitrogen and stirring vigorously. After dissolution, the mixture was let to cool down to room temperature. Isocyanate (a mixture of 50% 4,4'-MDI and 50% 2,4'-MDI) was added to the reaction flask while blanketing with nitrogen and stirring vigorously (1.05 mole of MDI per mole of OH). The reaction mixture gelled instantaneously, and yielded a brittle material. The material was washed with dry acetonitrile. The material was then dried under vacuum and filled into containers flushed with nitrogen. XRD analysis of the material indicated a complete amorphous structure, without any residual crystalline signals (CI=0%).

Example 4

Corn starch (Sigma-Aldrich) was dried under vacuum at 80° C. for 6 hours and weighted into a reaction flask Anhydrous DMSO was added and the mixture (10 wt % corn starch) was stirred at room temperature for 1 hour. Isocyanate (a mixture of 50% 4,4'-MDI and 50% 2,4'-MDI) was added to the reaction flask while blanketing with nitrogen and stirring vigorously at room temperature (1.05 mole of MDI per mole of OH) for 1 hour. The polysaccharide derivative was filtered off and washed with dry acetonitrile. The material was then dried under vacuum and filled into containers flushed with nitrogen.

FT-IR analysis of the polysaccharide derivative exhibited a urethane stretch at 1730 cm$^{-1}$ and an isocyanate stretch at 2275 cm$^{-1}$.

The crystallinity index (CI) of neat semicrystalline corn starch and of the polysaccharide derivative was measured. The CI of semicrystalline corn starch was 30%, after modification the CI was 30%. This shows that this process for preparing the starch derivative had limited effects on the bulk crystallinity and related bulk properties of the corn starch.

Comparative Example 5

Corn starch was dried under vacuum at 80° C. for 6 hours and weighted into a reaction flask. A 10 wt % solution of corn starch was made by adding DMSO to the reaction flask, and heating the mixture to 75° C. for 1 hour while blanketing with nitrogen and stirring vigorously. This solution was added to isocyanate (a mixture of 50% 4,4'-MDI and 50% 2,4'-MDI) while blanketing with nitrogen and stirring vigorously at room temperature (1 mole of MDI per mole of OH). The starch was filtered, and washed with dry acetonitrile. The material was then dried under vacuum and filled into containers flushed with nitrogen. XRD analysis indicated a complete amorphous structure, without any residual crystalline signals (CI=0%).

FT-IR analysis of the polysaccharide derivative exhibited a urethane stretch at 1730 cm$^{-1}$ and an isocyanate stretch at 2275 cm$^{-1}$.

Comparative Example 6

D-glucose was dried under vacuum at 60° C. for 12 hours and weighted into a reaction flask. 4,4'-MDI (1.05 mole of MDI per mole of OH) was added to the reaction flask while blanketing with nitrogen and the mixture was heated up to 200° C. for 2 hours. Thereafter, the mixture was allowed to slowly cool to room temperature over a 12 hour period. The resultant material was then ground to a fine powder, dispersed in dry KBr and the IR spectrum recorded (transmission mode).

IR showed a large consumption of the NCO functionality (loss of absorption band at 2275 cm$^{-1}$). However, no urethane peak at 1730 cm$^{-1}$ was observed, indicating that the loss of NCO is not due to reaction with glucosic OH groups. Urea formation is however seen. Heat and MDI drove a dehydration condensation of the glucose generating cellobiose and the liberated water reacted with the MDI to generate urea.

Examples on Applications

Following examples demonstrate that polysaccharide derivatives prepared according to the invention are much more compatible with polyurethane (PU) components upon dispersion. Furthermore, it is shown that retention of the crystallinity gives improved properties to the PU system.

Example 7

The polysaccharide derivative prepared in Example 1 was dispersed in SUPRASEC S2020 (uretonimine-enriched MDI), yielding a 10 w % dispersion, by high shear blade mixing (3000 rpm, 4 hours). A stable dispersion was observed, displaying no noticeable sedimentation after 24 hours.

Comparative Example 8

Microcrystalline cellulose (Neat Avicel) was dispersed in SUPRASEC S2020 (uretonimine-enriched MDI), yielding a 10 w % dispersion, by high shear blade mixing (3000 rpm, 4 hours). The dispersion showed a poor stability, and full sedimentation was observed after 2 hours.

Example 9

The polysaccharide derivative prepared in Example 1 was dispersed in SUPRASEC S2144 (MDI prepolymer), yielding a 10 wt % dispersion, by high shear blade mixing (3000 rpm, 4 hours). The material was poured into a mould and cured by moisture at room temperature for 2 days. Tensile strength was measured from dogbones at 50 mm/min at room temperature according to DIN 53504. The results are shown in Table 1.

TABLE 1

| PU | Polysaccharide | Crystallinity polysaccharide (%) | Stress at break (MPa) |
| --- | --- | --- | --- |
| S2144 | — | — | 17.6 |
| S2144 | Example 1 | 83 | 26.9 |

Example 10

The polysaccharide derivative prepared in Example 4 and Comparative example 5 (Comp example 5) were dispersed in SUPRASEC 52144 (MDI prepolymer), yielding a 10 wt % dispersion, by high shear blade mixing (3000 rpm, 4 hours). The materials were poured into a mould and cured by moisture at room temperature for 2 days. Tensile strength was measured on dogbones at 50 mm/min at room temperature according to DIN 53504. The results are shown in Table 2.

TABLE 2

| PU | Polysaccharide | Crystallinity polysaccharide (%) | Stress at break (MPa) |
| --- | --- | --- | --- |
| S2144 | — | — | 17.6 |
| S2144 | Corn starch | 30 | 16.0 |
| S2144 | Comp example 5 | 0 | 6.5 |
| S2144 | Example 4 | 30 | 23.6 |

These results demonstrate that both derivatization with isocyanate and crystallinity are important requirements for the derivatized polysaccharide to yield improved properties.

It is to be understood that although preferred embodiments have been discussed for providing embodiments according to the present invention, various modifications or changes may be made without departing from the scope and spirit of this invention.

The invention claimed is:

1. A process for preparing a polysaccharide derivative, comprising the steps of: (a) contacting at least one polysaccharide having a crystallinity index of at least 20% as measured by XRD with at least one polysaccharide swelling agent at a temperature of at most 70° C.; and (b) subsequently, contacting the product of step (a) with at least one aromatic isocyanate, wherein the at least one aromatic isocyanate is a polyisocyanate selected from the group consisting of:
   at least one of 2,4'-, 2,2'-, and 4,4'-methylene diphenyl diisocyanate;
   a mixture of at least one of 2,4'-, 2,2'-, and 4,4'-methylene diphenyl diisocyanates and one or more oligomers thereof;
   one or more derivatives of at least one of 2,4'-, 2,2'-, and 4,4'-methylene diphenyl diisocyanate, wherein one or more of the derivatives have a urethane, isocyanurate, allophonate, biuret, uretonimine, uretdione, or iminooxadiazinedione group;
   one or more derivatives of an oligomer of at least one of 2,4'-, 2,2'-, and 4,4'-methylene diphenyl diisocyanate, wherein one or more of the derivatives have a urethane, isocyanurate, allophonate, biuret, uretonimine, uretdione, or iminooxadiazinedione group;
   tetramethylxylene diisocyanate;
   1,5-naphthalenediisocyanate;
   p-phenylenediisocyanate;
   tolidine diisocyanate; and
   combinations thereof.

2. The process according to claim 1 wherein the at least one polysaccharide swelling agent is a non isocyanate reactive polysaccharide swelling agent.

3. The process according to claim 1 wherein the at least one polysaccharide swelling agent is selected from the group comprising sulfoxides, formamides, acetamides, pyrrolidones, pyridines, imidazoles and mixtures thereof.

4. The process according to claim 1 wherein the at least one polysaccharide comprises at least one glucose sub-unit.

5. The process according to claim 1 wherein the at least one polysaccharide is selected from the group comprising: cellulosic compounds; starches; agarose; alginic acid; alguronic acid; alpha glucan; amylose, amylopectin; arabinoxylan; beta-glucan; callose; capsulan; carrageenan; cellodextrin; cellulin; chitin; chitosan; chrysolaminarin; curdlan; cyclodextrin; DEAE-sepharose; dextran; dextrin; alpha-cyclodextrin; ficoll; fructan; fucoidan; galactoglucomannan; galactomannan; gellan gum; glucan; glucomannan; glycocalyx; glycogen; hemicellulose; hypromellose; icodextrin; kefiran; laminarin; lentinan; levan; lichenin; maltodextrin; mixed-linkage glucan; mucilage; natural gum; oxidized cellulose; paramylon; pectic acid; pectin; pentastarch; pleuran; polydextrose; polysaccharide peptide; porphyran; pullulan; schizophyllan; sepharose; sinistrin; sizofiran; sugammadex; welan gum; xanthan gum; xylan; xyloglucan; zymosan; glycosaminoglycans, chondroitin, chondroitin sulfate, dermatan sulfate, heparan sulfate, heparin, heparinoid, hyaluronan, keratan sulfate, restylane, sodium hyaluronate, and sulodexide; and mixtures thereof.

6. The process according to claim 1 wherein the at least one polysaccharide is a cellulosic compound selected from the group comprising:
cellulose, nanocellulose, art silk, bacterial cellulose, bamboo fibre, carboxymethyl cellulose, cellodextrin, cellophane, celluloid, cellulose acetate, cellulose acetate phthalate, cellulose triacetate, cellulosome, cotton, croscarmellose sodium, crystalate, ciethylaminoethyl cellulose, dissolving pulp, ethulose, ethyl cellulose, fique, hydroxyethyl cellulose, hydroxyethyl methyl cellulose, hydroxypropyl cellulose, hypromellose, lyocell, mercerised pulp, methyl cellulose, microbial cellulose, microcrystalline cellulose, modal (textile), nitrocellulose, parkesine, pearloid, pulp, paper, rayon, sodium cellulose phosphate, supima, viscose, vulcanized fibre, wood fibre, and mixtures thereof.

7. The process according to claim 1 wherein the at least one polysaccharide is a starch selected from the group comprising: corn starch, amylose, acetylated distarch adipate, amylomaize, amylopectin, cyclodextrin, dextrin, dialdehyde starch, erythronium japonicum, high-fructose corn syrup, hydrogenated starch hydrosylate, hydroxyethyl starch, hydroxypropyl distarch phosphate, maltitol, maltodextrin, maltose, pentastarch, phosphated distarch phosphate, potato starch, starch, waxy corn, waxy potato starch, and mixtures thereof.

8. The process according to claim 1 wherein the NCO content of the polysaccharide derivative is at least 0.2%, as measured according to DIN 53185.

9. The process according to claim 1 wherein the polysaccharide derivative is in the form of granules, wherein the granules have a particle size distribution wherein the D50 is at most 1.0 mm, wherein D50 is defined as the particle size for which fifty percent by weight of the particles has a size lower than the D50 according to standard ISO 13320:2009.

10. The process according to claim 1 wherein the polysaccharide derivative is in the form of a yarn or fiber, with a linear mass density of at most 2000 denier.

11. The process according to claim 1 wherein the polysaccharide derivative is in the form of a textile or fabric, wherein the textile or fabric may be woven or unwoven.

12. The process according to claim 1 wherein the at least one compound is selected from the group comprising: dimethyl sulfoxide, diethyl sulfoxide, ethylmethyl sulfoxide, N,N-dimethyl formamide, N,N-diethyl formamide, N,N-ethylmethyl formamide, N-methyl-pyrrolidone, pyridine, bromo-pyridine, chloro-pyridine, N,N-dimethyl acetamide, N,N-diethyl acetamide, N,N-ethylmethyl acetamide, 1,3-dimethyl-2-imidazolidinone, imidazolidinone, 1-methyl-2-imidazolidinone, 1-ethyl-2-imidazolidinone, 1-allyl-3-methylimidazolium chloride, 1-butyl-3-methylimidazolium chloride, 1-ethyl-3-methylimidazolium chloride, and mixtures thereof.

13. The process according to claim 1 wherein step (a) is performed for a time period of at least 30 minutes before step (b).

14. The process according to claim 1 wherein the water content in the at least one polysaccharide, the at least one aromatic isocyanate and the at least one compound is at most 0.5% by weight.

* * * * *